(12) United States Patent
Anglin et al.

(10) Patent No.: US 7,412,433 B2
(45) Date of Patent: Aug. 12, 2008

(54) HIERARCHICAL STORAGE MANAGEMENT USING DYNAMIC TABLES OF CONTENTS AND SETS OF TABLES OF CONTENTS

(75) Inventors: Matthew Joseph Anglin, Tucson, AZ (US); David Maxwell Cannon, Tucson, AZ (US); Mark Alan Haye, Tucson, AZ (US); Michael A. Kaczmarski, Tucson, AZ (US); Donald Paul Warren, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 10/299,266

(22) Filed: Nov. 19, 2002

(65) Prior Publication Data

US 2004/0098363 A1      May 20, 2004

(51) Int. Cl.
  *G06F 7/00*      (2006.01)
  *G06F 17/30*     (2006.01)
  *G06F 17/00*     (2006.01)
(52) U.S. Cl. .......................... 707/1; 707/101; 707/102
(58) Field of Classification Search ............... 707/1–10, 707/101–104; 711/162
See application file for complete search history.

(56) References Cited

U.S. PATENT DOCUMENTS

| | | | | |
|---|---|---|---|---|
| 5,644,766 | A * | 7/1997 | Coy et al. | 707/204 |
| 5,761,678 | A | 6/1998 | Bendert et al. | 707/204 |
| 5,802,599 | A | 9/1998 | Cabrera et al. | 711/170 |
| 5,897,661 | A | 4/1999 | Baranovsky et al. | 711/170 |
| 5,963,963 | A | 10/1999 | Schmuck et al. | 707/205 |
| 5,966,707 | A | 10/1999 | Van Huben et al. | 707/10 |

(Continued)

FOREIGN PATENT DOCUMENTS

JP      7114464      5/1995

(Continued)

OTHER PUBLICATIONS

Windows XP, "Set advanced backup option", 2001, 2 pages.*

(Continued)

*Primary Examiner*—Hosain T Alam
*Assistant Examiner*—Shew-Fen Lin
(74) *Attorney, Agent, or Firm*—Kunzler & McKenzie (57) ABSTRACT

A system, apparatus, and process creates a table of contents (TOC), including one or more table of contents (TOC) entries, to manage data in a hierarchical storage management system. Each TOC entry contains metadata describing the contents and attributes of a data object within an image, which is an aggregation of multiple data objects into a single object for storage management purposes. The TOC is stored in a storage hierarchy, such as magnetic disk, for fast access of and efficient operation on the aggregated TOC entries. The system, apparatus, and process also provide for aggregating the TOC entries from one or more TOCs into a TOC set in the storage management server database. The TOC set may be manipulated and queried in order to find a particular data object or image referenced by a TOC entry. The TOC entries, TOCs, and TOC sets may be dynamically managed by the hierarchical data storage management system through implementation of a set of policy management constructs that define appropriate creation, retention, and movement of the objects within the database and storage hierarchy.

16 Claims, 9 Drawing Sheets

U.S. PATENT DOCUMENTS

| | | | |
|---|---|---|---|
| 6,330,572 B1 * | 12/2001 | Sitka | 707/205 |
| 6,389,421 B1 | 5/2002 | Hawkins et al. | 707/10 |
| 6,405,315 B1 | 6/2002 | Burns et al. | 713/190 |
| 6,453,325 B1 * | 9/2002 | Cabrera et al. | 707/204 |
| 6,728,711 B2 * | 4/2004 | Richard | 707/9 |
| 6,785,789 B1 * | 8/2004 | Kekre et al. | 711/162 |
| 6,865,655 B1 * | 3/2005 | Andersen | 711/162 |
| 6,938,056 B2 * | 8/2005 | Burns et al. | 707/202 |
| 6,996,585 B2 * | 2/2006 | Lai et al. | 707/203 |
| 7,092,977 B2 * | 8/2006 | Leung et al. | 707/205 |
| 2001/0051948 A1 | 12/2001 | Srinivasan et al. | 707/102 |
| 2001/0052073 A1 | 12/2001 | Kern et al. | 713/61 |
| 2002/0046215 A1 * | 4/2002 | Petrocelli | 707/200 |

FOREIGN PATENT DOCUMENTS

JP   7262058   10/1995

OTHER PUBLICATIONS

Wei-keng Liao, Xaiohui Shen, and Alok Choudhary, High Performance Computing HiPC 2000, 7th International Conference, pp. 294-300.*

William Johnston, Jin Guojun, Jason Lee, Mary Thompson, and Brian Tierney, Distributed Large Data-Object Management Architecture, SPIE Proceedings, pp. 478-482.*

Eric N. Hanson, Tina M. Harvey, and Mark A. Roth, Experiences in DBMS Implementation Using an Object-Oriented Persistent Programming Language nad a Database Toolkit, oopsla'91, pp. 314-328.*

* cited by examiner

HIERARCHICAL STORAGE MANAGEMENT USING DYNAMIC TABLES OF CONTENTS AND SETS OF TABLES OF CONTENTS

BACKGROUND OF THE INVENTION

1. Field of the Invention

The present invention relates to data and metadata management in a hierarchical data storage system and more particularly to management of metadata in the form of tables of contents (TOC), each describing an aggregation of data objects, and aggregated sets of tables of contents (TOC Set).

2. Description of Related Art

Conventionally, a data storage management application stores individual data objects, such as files and directories, in a storage hierarchy linked to the storage management server. The storage hierarchy typically includes one or more levels of data storage media that correspond to the accessibility of the stored data. For example, one level may include a number of direct access storage devices (DASD's) that provide relatively fast access to stored data. Another level may include a plurality of sequential access storage devices that provide slower access to data, but typically are more cost effective as measured by the data storage capacity per storage device cost.

The current method of storing individual data objects in a storage hierarchy provides a high degree of management granularity, but requires substantial storage and storage management overhead. In other words, each of the data objects can be accessed, retrieved, moved, or otherwise manipulated independent of all other data objects. The price for management at this level can be significant in that a storage management server must maintain a database tracking each of the individual data objects. Thus, the storage management server database may require a prohibitive storage capacity in order to store all of the metadata associated with all of the data objects. Additionally, the overall operation complexity may be considerably greater in order to provide the management granularity.

Another approach in managing data objects within a storage hierarchy employs composite objects that contain multiple data objects aggregated into a single operable storage object. For example, one composite object may contain all of the data objects in an entire file system. A backup of the file system, instead of creating numerous data objects and corresponding metadata entries in the database, may be fully contained in a single composite object for which only one database entry is required in the storage management server database.

Such a composite object, whether created for backup purposes or other storage management purposes, is commonly referred to as an image. The backup image created in this scenario described contains all of the data objects from the file system and may be stored as a single object in the storage hierarchy, such as on magnetic tape.

The use of images in a storage hierarchy may greatly reduce the management complexity in that the storage manager server may manipulate all of the data objects in a single image as a single object. Storing the data objects as a single image may also enable more rapid backup and restore operations on the data within the image.

Current hierarchical data storage systems, however, do not provide for improved management of the metadata associated with the data objects in an image. It would be a great advantage in the art to provide a process and apparatus capable of reducing the overhead required to manage such metadata in a manner similar to the management of the data objects in an image.

BRIEF SUMMARY OF THE INVENTION

The present invention has been developed in response to the present state of the art, and in particular, in response to the problems and needs in the art that have not yet been fully solved by currently available hierarchical data storage management systems. Accordingly, the present invention has been developed to provide a system, apparatus, and process for managing hierarchical data storage that overcome many or all of the above-discussed shortcomings in the art.

The hierarchical data storage management apparatus is provided with a logic unit containing a plurality of modules configured to carry out the individual steps of hierarchical data storage management as set forth in this disclosure. These modules in the described embodiments include a TOC creation module, a TOC update module, a metadata storage module, a policy management module, a TOC set merge module, a TOC set query module, a TOC set extension module, and a TOC set retraction module.

In one embodiment, the present invention describes a hierarchical data storage management apparatus that is configured to create and manage a table of contents (TOC) that contains an aggregation of the metadata describing the individual data objects in a single image. The metadata associated with a single data object is referred to as a table of contents entry (TOC entry). Each TOC is made up of a plurality of TOC entries that correspond to an equal number of data objects. The TOC creation module, for instance, is configured to create a TOC as the image is created in the storage hierarchy, in one embodiment, or by scanning the contents of an existing image in the storage hierarchy, in another embodiment.

The apparatus is further configured to update an existing TOC through for example the TOC update module. This module may be configured to aggregate additional metadata, in the form of TOC entries, to an existing TOC if a data object is added to an existing image. Similarly, if an existing image is modified to include fewer data objects, such as by deleting one or more data objects originally in the image, the TOC update module may update the TOC through deletion of the TOC entry corresponding to the removed data object.

The metadata storage module in the apparatus may be configured to store TOC entries in the storage server database as a sub-function of the overall apparatus. The metadata storage module may store TOC entries in the database prior to writing the TOC entries to a TOC within the storage hierarchy, such as on a magnetic disk. The metadata storage module may also be configured to assist in the creation and use of TOC sets, which will be described below.

The policy management module may be configured to manage the creation, retention, and overall processing of TOC entries, TOCs, and TOC sets within the database and storage hierarchy.

The apparatus may also be configured to merge the TOC entries from one or more TOCs as a single TOC set in a database table in the storage management server. More particularly, the TOC set merge module may be configured to copy the TOC entries from one or more TOCs in the storage hierarchy and store the TOC entries as a single, merged table in the database. The resulting TOC set may be sorted, expanded, retracted, and queried according to the needs of a user in identifying a corresponding data object or image stored in the storage hierarchy.

For example, a TOC set created by the TOC set merge module may include the TOC entries associated with a number of data objects stored during one or more full and incremental backups of a file system. Upon merging the TOC entries from the specified TOCs, the TOC set query module may be employed to query the newly created TOC set in order to identify a most recent version of a single file backed up within the time frame corresponding to the specified TOCs and images. For query purposes, it may also be beneficial to employ the TOC set extension and retraction modules in order to manipulate the breadth of the query among the TOC entries from the specified TOCs.

A process of the present invention is also presented for managing hierarchical data storage in a data storage system. The process in the disclosed embodiments substantially includes the steps necessary to carry out the functions presented above with respect to the operation of the apparatus.

More specifically, the process includes creating a TOC within the storage hierarchy. The TOC creation process may be divided into two sub-processes including storing the TOC entries in the storage management server database and unloading the TOC entries from the database to a TOC within the storage hierarchy.

The TOC creation process may include creating a TOC as an image is created or by scanning the data objects in an existing image. In either case, the TOC creation process may store one or more TOC entries in a temporary database table in the storage management server.

The TOC unloading process involves identifying and accessing the appropriate storage hierarchy media. Once accessed, the process copies the TOC entries from the database in the storage management server to the designated storage hierarchy media. After a TOC has been created in this way, the process creates or modifies an image descriptor and a TOC descriptor in the database. The image descriptor includes metadata describing the contents and attributes of the image, such as the hierarchical storage location of the image. The TOC descriptor contains metadata describing the contents and attributes of the TOC, such as the location of the TOC in the database or in the storage hierarchy.

The hierarchical data storage management process also provides a method for accessing the TOC entries of one or more TOCs and creating a TOC set in the database in the storage management server. The TOC set creation process includes identifying the appropriate TOCs and accessing the TOC entries from these TOCs in the storage hierarchy. Once accessed, the process copies the corresponding TOC entries to a database table in the storage management server. In this way, the TOC entries from one or more TOCs may be merged together in a single database table for querying and other operations. After a TOC set has been created, the process creates a TOC set descriptor and stores the TOC set descriptor in local storage server memory. Alternately, the TOC set descriptor may be stored in the storage hierarchy.

The TOC set descriptor is stored in memory so that it may be accessed at a later date. The TOC set descriptor is removed from the memory after the TOC set has been removed from the database under policy management constraints. A user that also wishes to access the same TOC set may reuse the TOC set, in a similar manner as described above, through accessing the TOC set descriptor. The TOC set descriptor includes metadata describing the contents and attributes of the TOC set, including a list of the TOCs from which TOC entries were merged.

These features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
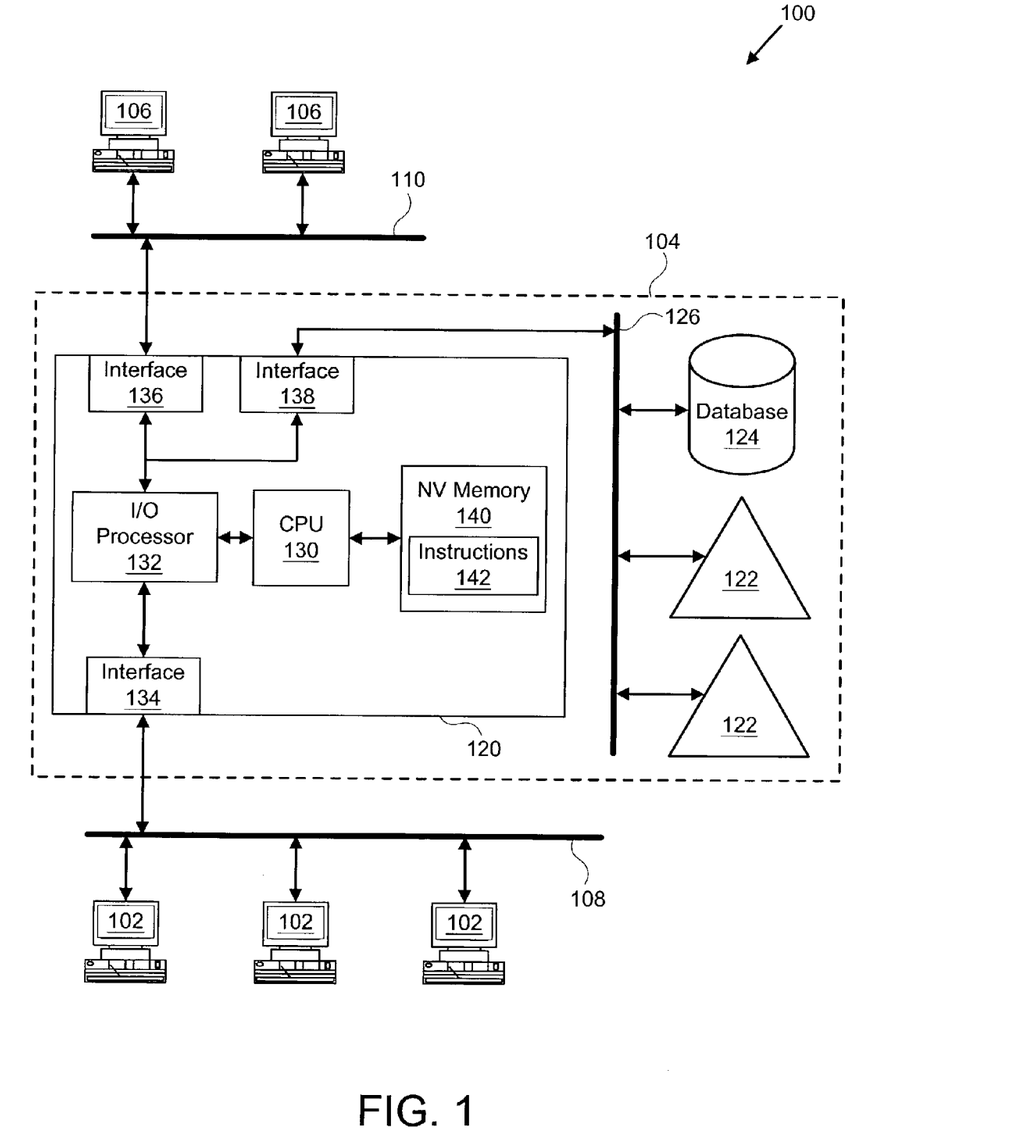
FIG. 1 is a schematic block diagram illustrating one embodiment of a representative hierarchical data storage management system in accordance with the present invention.

FIG. 1 depicts a representative hierarchical data storage management system 100 through or in conjunction with which the present invention may be employed. The system 100 generally consists of one or more user client stations 102, a hierarchical data storage subsystem 104, and one or more administrator stations 106.

The user client stations 102 are electronically connected to the storage subsystem 104 via a communications channel 108, such as a local area network (LAN). The client stations 102 may include personal computers, workstations, or servers running a variety of operating systems. The communications channel 108 may include a wired network system, such as conductive wires or busses, fiber optic cables, or other physical structures suitable for conducting an electronic signal between network system components. Alternately, the communications channel 108 may include a wireless connection between network system components or a combination of wired and wireless components. Additionally, the communications channel 108 may include means for connecting geographically distinct user stations 102 and storage subsystem 104, such as the internet using a customary transmission protocol like TCP/IP. The communications channel 108 may also include a proprietary subsystem in part or whole similar in function to the internet.

The administrator stations 106 are electronically connected to the storage subsystem 104 via a communications channel 110 that is substantially similar to the communications channel 108. The administrator stations 106 may also be connected directly to the storage subsystem 104 where proximity and function permit. The administrator stations 106 are configured to administer and monitor the functionality and processing of the storage subsystem 104.

The hierarchical data storage subsystem 104 is configured to store data and manage the stored data according to storage access requests from the user client stations 102 and the administrator stations 106. The depicted storage subsystem 104 includes a data processing apparatus 120 operationally coupled to one or more hierarchical data storage units 122 and a database 124 via a communications channel 126. The communications channel 126 may be a storage area network (SAN) or alternately may be similar to the communications channels 108 and 110 described above.

The data processing apparatus 120 illustrated may be a commercially available storage server or may be a compilation of compatible equipment configured to manage the data storage within the hierarchical data storage units. In general, the data processing apparatus 120 includes a central processing unit 130 for processing the digital signals received from the client stations 102 and the administrator stations 106. The central processing unit 130 is digitally coupled with an I/O processor 132 that in turn is coupled to interfaces 134, 136, and 138.

The data processing apparatus is configured to receive the digital signals from the stations 102 and 106 via the interfaces 134 and 136, respectively. Similarly, the central processing unit 130 transmits signals to the hierarchical data storage units 122 and database 124 via the I/O processor 132, the interface 138, and the communications channel 126.

The central processing unit 130 is also digitally coupled to memory storage 140, such as a magnetic hard disk drive. The memory storage 140 may store programming instructions 142 accessed by the central processing unit 130 for control of the digital processing system 120.

Figure 2:
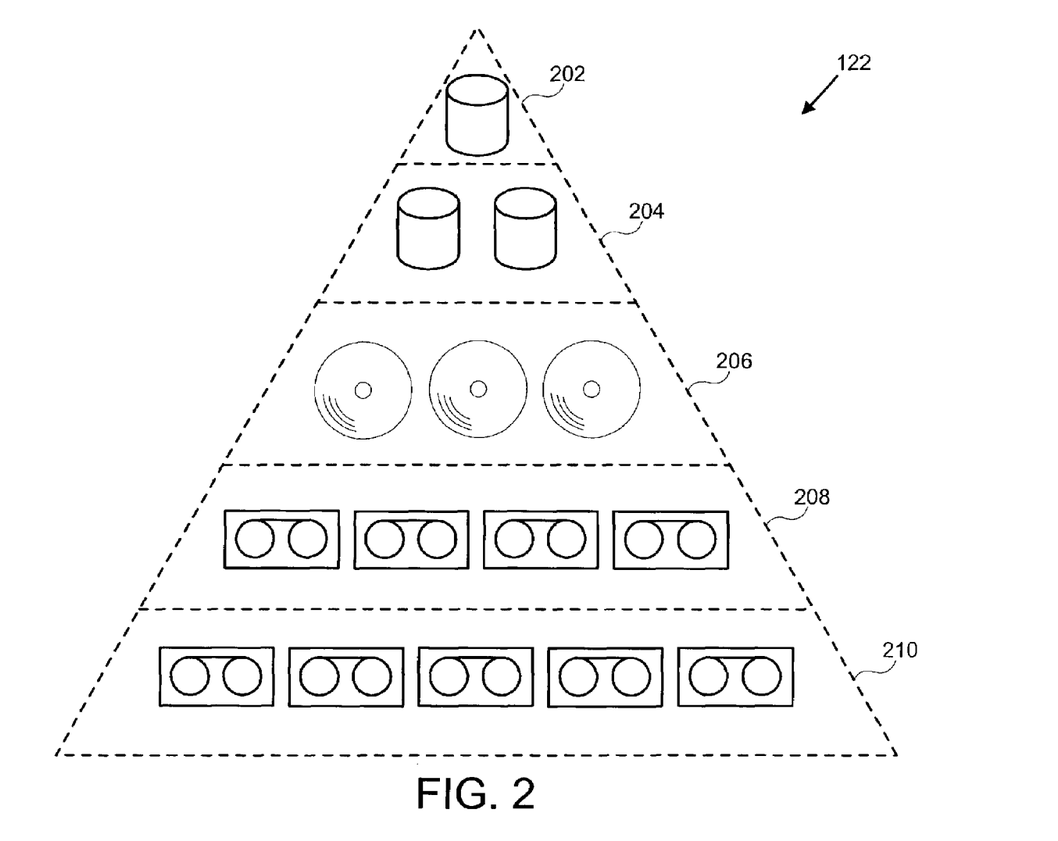
FIG. 2 is a schematic block diagram illustrating one embodiment of a representative data storage hierarchy in accordance with the present invention.

FIG. 2 represents a typical data storage hierarchy 122 in which diagrammatically "higher" data storage media and devices correspond to faster accessibility to stored data. Specifically, this depiction includes high-speed data storage media and devices at the "top" levels 202 and 204 of the hierarchy 122. For example, level 202 might include a direct access storage devices (DASD) such as a high-speed magnetic disk drive or high-speed optical disks and drives. In certain embodiments, the top level 202 may even include the database 124 of FIG. 1. Level 204 might include storage media and devices similar to those in level 202, but of slower access speeds.

In the illustrated embodiment, level 206 includes multiple optical disks and one or more corresponding optical disk drives. Once again, these storage media devices represent access times slower than the devices depicted in levels 202 and 204.

Levels 208 and 210 represent the slowest access times for all of the media types and devices shown in the depicted storage hierarchy 122. These levels 208 and 210 might include sequential access storage devices such as magnetic tape media and drives.

The storage hierarchy 122 is also very helpful to illustrate the cost structure of the various media types and devices within the hierarchy 122. In particular, the "bottom" levels 210 and 208 of the diagram represent the least costly storage implementation per data unit while the "top" levels 202 and 204 represent the most costly data storage schemes. From this it is apparent and not unexpected that the storage media devices that offer the fastest data access times are also typically the most expensive to implement for a given amount of data storage capacity.

This cost/speed relationship is very important from a production and profitability perspective and dictates that a manufacturer or end-user may benefit from employing the least expensive data storage scheme that will provide the required minimum performance characteristics or better. For example, a user whose operations require data access speed equivalent to only sequential access storage devices may not be benefited from employing high-speed optical disk drives for all of their data storage. Conversely, a client with very stringent performance requirements in need of the absolutely fastest data retrieval available would not be satisfied with the implementation of a system consisting solely of currently available magnetic tapes and drives. Instead, such a client would employ direct access storage devices for all data storage within the projected data storage capacity requirements and project funding constraints.

Another aspect of the storage hierarchy 122 that is pertinent to the present invention is the designation and use of storage pools. A storage pool is one or more storage media, such as disks and tapes, that are assigned as a group by the hierarchical storage manager for storage of similar data. The assignment may be automatically executed based on storage policy or may be manually dictated by a user via an administrator station 106. A typical storage pool may correspond to a particular type of data, user group or department (via identified user client stations 102), or other grouping criteria set forth. For example, one embodiment of the storage pools within the storage hierarchy 122 may designate one group of magnetic disks 204 for primary storage of data and a second group consisting of magnetic tapes 208 as a backup storage pool. One skilled in the art, however, will recognize other uses within the scope of this invention that are not specifically described herein.

Figure 3:
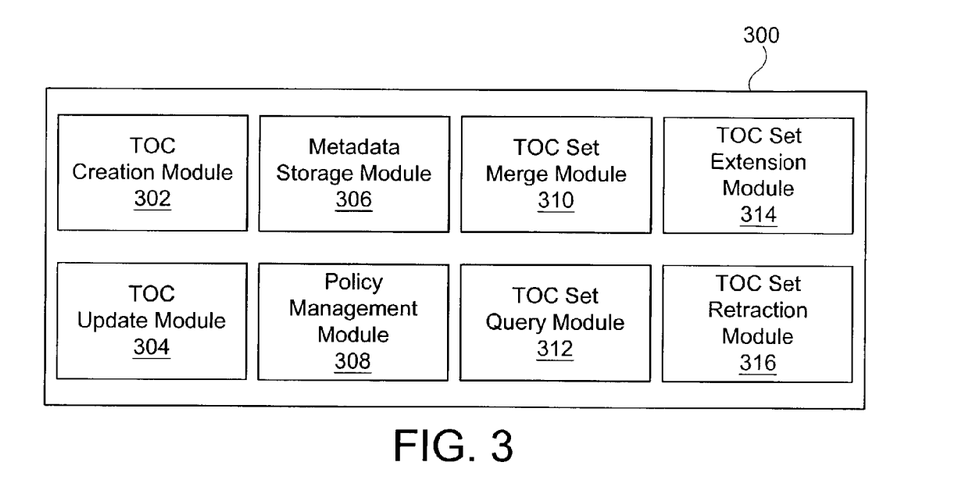
FIG. 3 is a schematic block diagram illustrating one embodiment of a representative hierarchical data storage management apparatus in accordance with the present invention.

FIG. 3 depicts one representation of a hierarchical data storage management apparatus 300 for use in a hierarchical data storage management system 100 as described above. The apparatus 300 is configured to create and use one or more tables of contents (TOCs) and in selected embodiments TOC sets, which will be described in more detail in the following figures. Thus, the apparatus 300 includes a variety of modules configured to create and use the TOCs and TOC sets. The apparatus 300, in one embodiment, includes a TOC creation module 302, a TOC update module 304, a metadata storage module 306, a policy management module 308, a TOC set merge module 310, a TOC set query module 312, a TOC set extension module 314, and a TOC set retraction module 316. The purpose and functionality of these modules 302-316 will be further explained in connection with the following figures.

Figure 4:
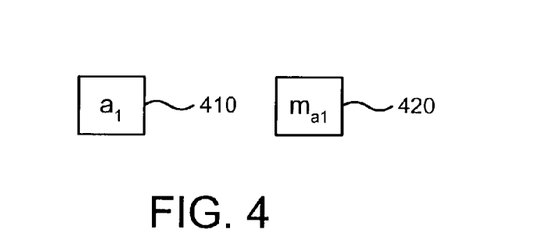
FIG. 4 is a schematic block diagram illustrating one embodiment of a representative data object and a representative table of contents (TOC) entry in accordance with the present invention.

At the simplest level, the following illustrations deal with one or more data objects 410 (designated as "$a_1$") and a corresponding number of TOC entries 420 (designated as "$m_{a1}$"), as depicted in FIG. 4. Each TOC entry 420 includes metadata describing a data object 410. For purposes of explanation, reference to a data object 410 in the description may refer to a file, directory, database, or other data object or structure. For each data object 410, the hierarchical data storage management system 100 may create corresponding metadata to describe the contents and attributes of the data object 410. This metadata may be stored, for example, in the database 124. A collection of metadata for a plurality of data objects is referred to herein as a "table of contents" (TOC), and each metadata object, corresponding to a single data object 410, is referred to as a TOC entry 420. Of course, metadata objects may be stored together in various data structures that allow the metadata objects to be collectively treated as a single object. These data structures include, by way of example, tables, linked lists, and flat files, and will be referred to herein, by way of definition, as tables of contents (TOCs).

Figure 5:
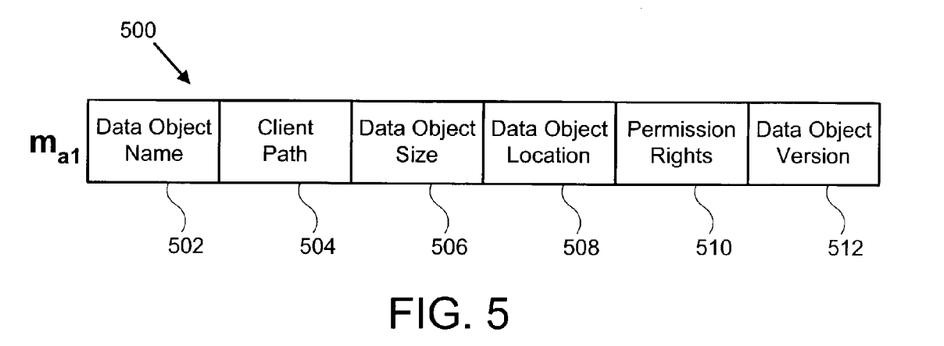
FIG. 5 is a schematic block diagram illustrating one embodiment of a representative TOC entry in accordance with the present invention.

FIG. 5 depicts one embodiment of a representative data structure of a TOC entry 420. The depicted TOC entry 420 describes a single data object 410 and includes a name field 502, a client path field 504, a size field 506, a location field 508, a permission rights field 510, and a version field 512.

The name field 502 identifies the name of the data object 410 described by the TOC entry 420. The client path field 504 identifies the directory path location of the data object 410 on a client station 102. The size field 506 identifies the total size of the data object 410. The location field 508 identifies the storage location of the data object 410 within the storage hierarchy 122. The location field 508 may in one embodiment be in the form of an offset when the data object 410 is stored within a larger data structure, as will be discussed later. The permission rights field 510 identifies any permission settings associated with the data object 410, such as read, write, copy, etc. The version field 512 uniquely identifies the corresponding version of the data object 410 in the form of a modification date or other version identifier.

Figure 6:
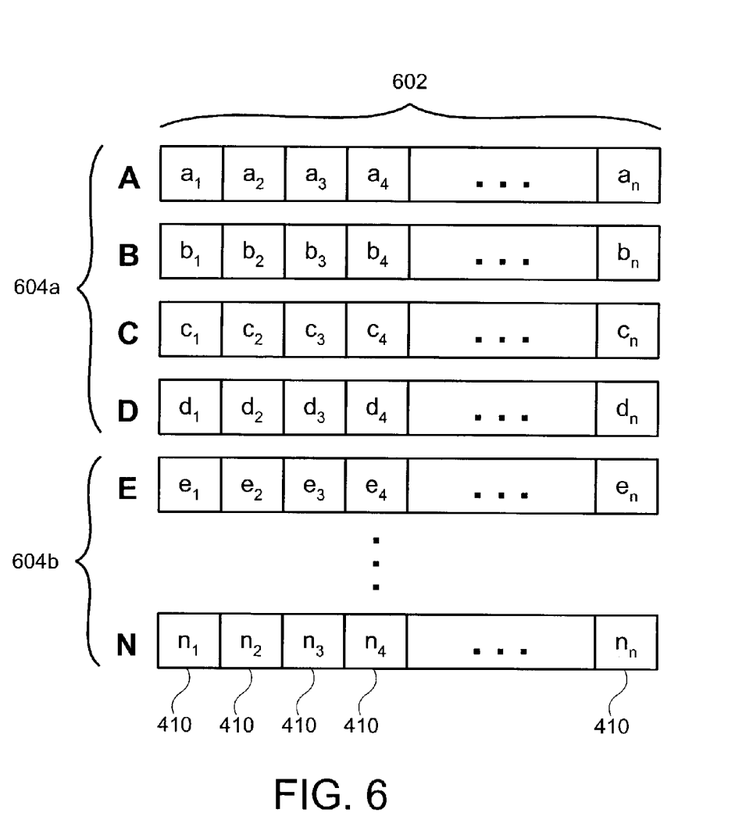
FIG. 6 is a schematic block diagram illustrating one embodiment of a representative plurality of data objects and images in accordance with the present invention.

For purposes of efficient storage and rapid access, one or more data objects 410 may be aggregated into a single object known as an "image" 602, as shown in FIG. 6. FIG. 6 illustrates a plurality of images 602. Each image 602 is designated by the majuscule letters "A," "B," "C," "D," and "E" through "N" and is an aggregation of user data objects 410. The individual data objects 410 are designated by the subscripted miniscule letters corresponding to the image 62 majuscule letter designation. For example, data object 410 "$a_1$" is the first data object 410 in image 602 "A." The user data objects 410 may include files, directories, databases, or other data objects or structures suitable for storage within an image 602, as described previously.

In the present description of the invention, an image 602 may be created by the hierarchical data storage subsystem 104 and stored within a particular storage media in the storage hierarchy 122 such as, for example, a magnetic tape 208. Storing the entire image 602 as a single object enables rapid backup and restore operations of all the data objects 410 within the image 602. The implementation of images 602 also simplifies the management of the data objects 410 as a whole because for many operations the storage management system 100 only needs to reference and manage a single image 602 instead of multiple, independent data objects 410.

FIG. 6 also depicts two groupings of the various images 602 in two separate storage pools 604a and 604b, as described above. In the embodiment shown, images 602 "A," "B," "C," and "D" are assigned to a first storage pool 604a. Images 602 "E" through "N" are assigned to a second storage pool 604b. In an alternate embodiment, all of the existing images 602 might be stored in a single storage pool 604. In a further embodiment, each of the images 602 may be stored in a distinct storage pool 604 so that the number of storage pools 604 approaches the number of images 602.

The use of images 602 and storage pools 604 is typically transparent to a host or client station 102 and serves to reduce file management overhead within the hierarchical data storage management system 100. In some cases, multiple copies of a single image 602 might exist in separate storage pools 604 for redundancy and backup purposes. Similarly, multiple copies of a single data object 410 may be stored in distinct images 602 according to storage management policy constraints.

Figure 7:
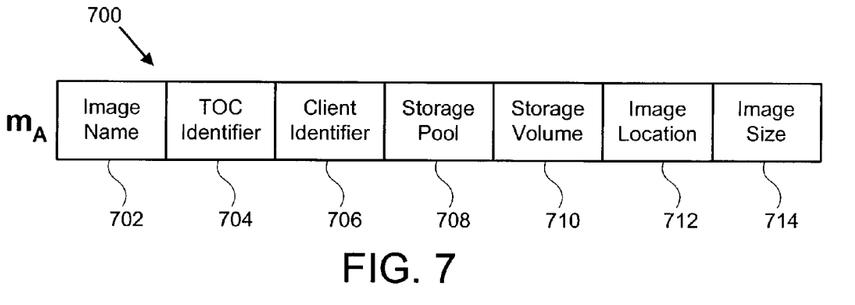
FIG. 7 is a schematic block diagram illustrating one embodiment of representative image descriptor.

For each image 602, the hierarchical data storage management system 100 compiles metadata describing the image 602. FIG. 7 depicts one embodiment of a representative data structure for an image descriptor 700, designated by "$m_A$." The depicted image descriptor 700 describes a single image 602 and includes a name field 702, a TOC identifier field 704, a client identifier field 706, a storage pool field 708, a storage volume field 710, a location field 712, and a size field 714. The image descriptor 602 is typically stored in the database 124.

The name field 702 identifies the name of the image 602 described by the image descriptor 700. The TOC identifier field 704 stores an identifier of a TOC corresponding to the image 602. The contents and structure of a TOC will be further described in conjunction with FIG. 8. The client identifier field 706 identifies the client station 102 from which the data objects 410 within the image 602 originated. The client identifier field 706 may also identify the directory path location on the client station 102 of the data objects 410.

The storage pool field 708 identifies the storage pool 604 in the storage hierarchy 122 in which the image 602 is located. The storage volume field 710 identifies the storage media volume on which the image 602 is located. In one embodiment, the image 602 is located on a high capacity magnetic disk 210. Alternately, the image 602 may be located in storage hierarchy media with slower or faster access speeds according to storage management policy considerations. The location field 712 identifies the location, such as an offset, of the image 602 in the storage media. The size field 714 identifies the total size of the image 602.

Figure 8:
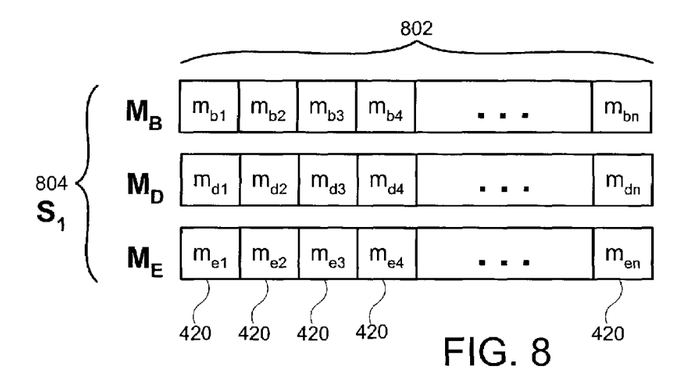
FIG. 8 is a schematic block diagram illustrating one embodiment of a representative plurality of table of contents (TOC) entries, tables of contents (TOCs), and a set of tables of contents (TOC Set) in accordance with the present invention.

In a similar manner to the aggregation of data objects 410 in an image 602, the metadata describing the individual data objects 410 may be aggregated in groups known as a "table of contents" (TOC) 802, as shown in FIG. 8. The concept of a TOC was introduced in the description of FIG. 4. Typically, the TOC 802 includes one or more TOC entries 420. FIG. 8 depicts a representative plurality of TOCs 802, each TOC 802 corresponding to an image 602. For example, TOC 802 "$M_B$" contains the TOC entries 420 "$m_{b1}$" through "$m_{bn}$" that correspond to the data objects 410 "$b_1$" through "$b_n$" in image 602 "B."

In one embodiment, the TOC 802 is stored in the storage hierarchy 122 in preferably a fast-access storage media, such as magnetic disk 202. Alternately, the TOC 802 may be stored in storage media of slower access with a result of slower processing of access requests.

Figure 9:
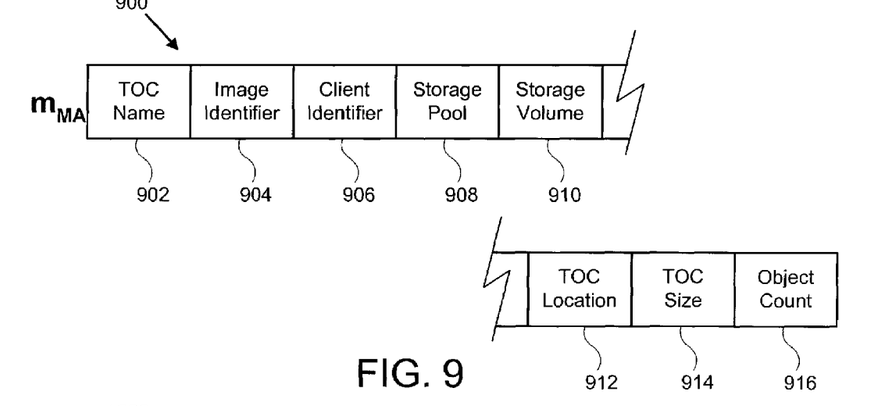
FIG. 9 is a schematic block diagram illustrating one embodiment of a representative table of contents (TOC) descriptor in accordance with the present invention.

FIG. 9 depicts a representative TOC descriptor 900, designated by "$m_{MA}$," that may describe the contents, storage location, and other metadata of the corresponding TOC 802. The depicted TOC descriptor 900 includes a name field 902, an image identifier field 904, a client identifier field 906, a storage pool field 908, a storage volume field 910, a location field 912, a size field 914, and an object count field 916.

The name field 902 identifies the name of the TOC 802 described by the TOC descriptor 900. The image identifier field 904 stores an identifier of an image corresponding to the TOC 802. The contents and structure of an image 602 were presented in conjunction with FIG. 6. The client identifier field 906 identifies the client station 102 from which the data objects 410 within the reference image 602 originated. The client identifier field 906 may also identify the directory path location on the client station 102 of the data objects 410.

The storage pool field 908 identifies the storage pool in the storage hierarchy 122 in which the TOC 802 is located. The storage volume field 910 identifies the storage media volume on which the TOC 802 is located. Preferably, the TOC 802 is located on a magnetic disk 202 that can be accessed very quickly. Alternately, the TOC 802 may be located in a storage hierarchy media with slower access speed. The location field 912 identifies the location, such as an offset, of the TOC 802 in the storage media. The size field 914 identifies the total size of the TOC 802. The object count field 916 identifies the number of active data objects 410 included in the reference image 602 corresponding to the TOC 802.

Returning to FIG. 8, the aggregation of one or more TOCs 802 is depicted as a TOC set 804. Specifically, FIG. 8 depicts a TOC set 804 "$S_1$" that includes the data objects 410 from TOCs 802 "$M_B$," "$M_D$," and "$M_E$." More particularly, the depicted TOC set 804 includes only the TOC entries 420 from the designated TOCs 802, which TOC entries 420 are merged into a single database table in the database 124. The TOC entries 420 shown are arranged as they might be in an individual TOC 802. Upon creating a TOC set 804, however, the TOC entries 420 of the multiple TOCs 802 are typically merged and reordered according to database operations generally known in the art and may consequently result in a TOC entry 420 order other than the illustration of FIG. 8.

Figure 10:
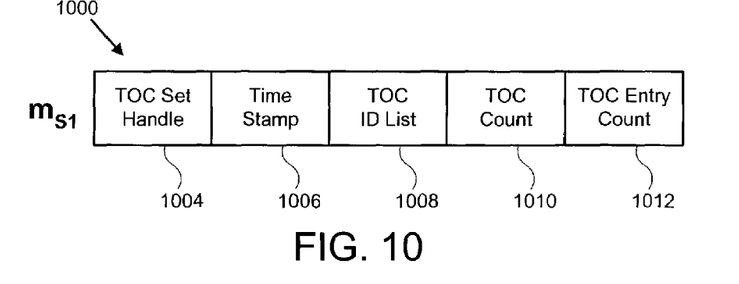
FIG. 10 is a schematic block diagram illustrating one embodiment of a representative table of contents (TOC) set descriptor in accordance with the present invention.

FIG. 10 depicts one embodiment of a representative TOC set descriptor 1000, designated by "$m_{S1}$." The depicted TOC set descriptor 1000 describes the contents and attributes of a TOC set 804 and includes a handle field 1004, a time stamp field 1006, a TOC ID list 1008, a TOC count field 1010, and a TOC entry count field 1012.

The TOC set handle field 1004 identifies a handle associated with the TOC set 804. The TOC set handle may be used by the hierarchical data storage management system 100 in identifying the TOC set 804 making the TOC set 804 available to a client via a client station 102 or administrator station 106. The time stamp field 1006 identifies a time stamp associated with for example the most recent access of the TOC set 804. Storage policy management may utilize the time stamp in one embodiment to determine retention, movement or other dynamic management operations on the TOC set 804.

The TOC identification list field 1008 identifies or points to a list of TOCs 802 from which data objects 410 have been accessed and merged in the TOC set 804 and the TOC count field 1010 identifies the total number of TOCs 802 accessed. Similarly, the TOC entry count field 1012 identifies the total number of TOC entries 420 that have been accessed and merged into the TOC set 804.

The description of the data structures provided surrounding the TOC entries 420, image descriptors 700, TOC descriptors 900, and TOC set descriptors 1000 is a general explanation of some of the typical fields that might be employed in each data structure respectively. One skilled in the art, however, will recognize that some of the depicted fields may be excluded and other additional fields may be included within the scope of this is invention. Modification of metadata fields may provide for enhanced management of the data structures in a hierarchical data storage management system 100, even though such metadata field variations are not specifically described herein.

Figure 11:
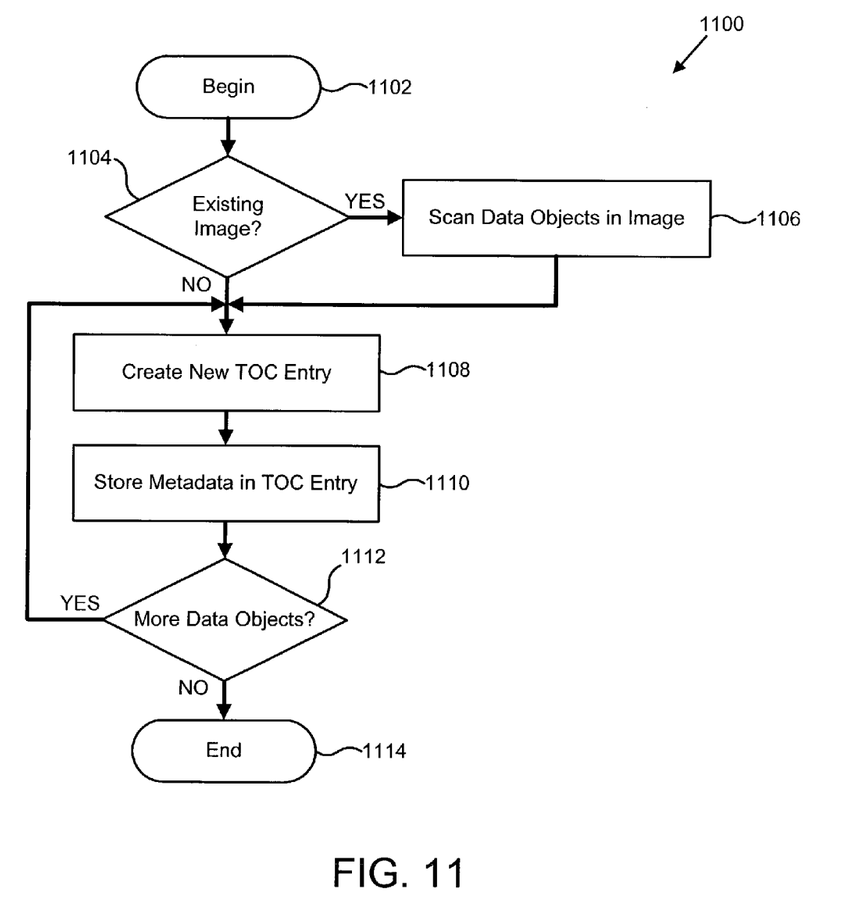
FIG. 11 is a schematic flow chart diagram illustrating one embodiment of a representative hierarchical data storage management process for storing table of contents (TOC) entries in a database table in accordance with the present invention.

FIG. 11 depicts a representative hierarchical data storage management process 1100 for creating and storing TOC entries 420. In one embodiment, the TOC entries 420 are stored directly in the storage hierarchy 122 for example in magnetic disk 202. Alternately, the TOC entries 420 are temporarily stored in the database 124 in the hierarchical data storage subsystem 104 prior to permanent storage in the storage hierarchy 122. This process 1100 may be a sub-process for creating a TOC 802.

The process 1100 begins 1102 in response to a request that may originate from an administrator station 106 or through an automatic operation internal to the hierarchical data storage management system 100. The process 1100 may in one embodiment be invoked at the time that an image 602 is created. In an alternate embodiment, the process 1100 may be invoked after an image 602 has already been created and stored in the storage hierarchy 122. The process 1100 determines 1104 if the process 1100 has been invoked to store TOC entries 420 for an existing image 602 or for a new image 602. If the TOC entries 420 are being stored in the database as a linked list, for example, for an existing image 602, the process 1100 scans 1106 the data objects 410 in the existing image 602.

For each data object 410, whether new or scanned, the process 1100 creates a new TOC entry 420 by collecting the metadata for a given data object 410. Once the process 1100 has created 1108 a new TOC entry 420, the process 1100 stores 1110 the appropriate metadata corresponding to the subject data object 410 in the desired storage location, for example in the database 124 via the metadata storage module 306. In one embodiment, the metadata is collected in the database 124, which may be a database attendant to a storage management program such as the Tivoli Storage Manager™ (TSM) produced by IBM Corporation™ of Armonk, N.Y.

Subsequently, the process 1100 determines 1112 if more data objects 410 are stored or are to be stored in the same image 602. If more data objects 410 are to be stored 1110, the process 1100 returns to step 1108 and iteratively proceeds until no further data objects 410 are stored or to be stored in the image 602. The process 1100 then ends 1114.

As mentioned above, one skilled in the art will recognize that additional metadata may be stored in additional fields of a TOC entry 420 without departing from the model of the present invention. Additionally, one or more TOC entry 420 storage locations may be collocated in one location on a single storage media, or may be located together or separately on individual storage media, including the database 124, the storage hierarchy 122, or another appropriate storage system. In any case, the storage location and collocation of the TOC entries 420 may vary without adversely affecting the design intent of the present invention.

Figure 12:
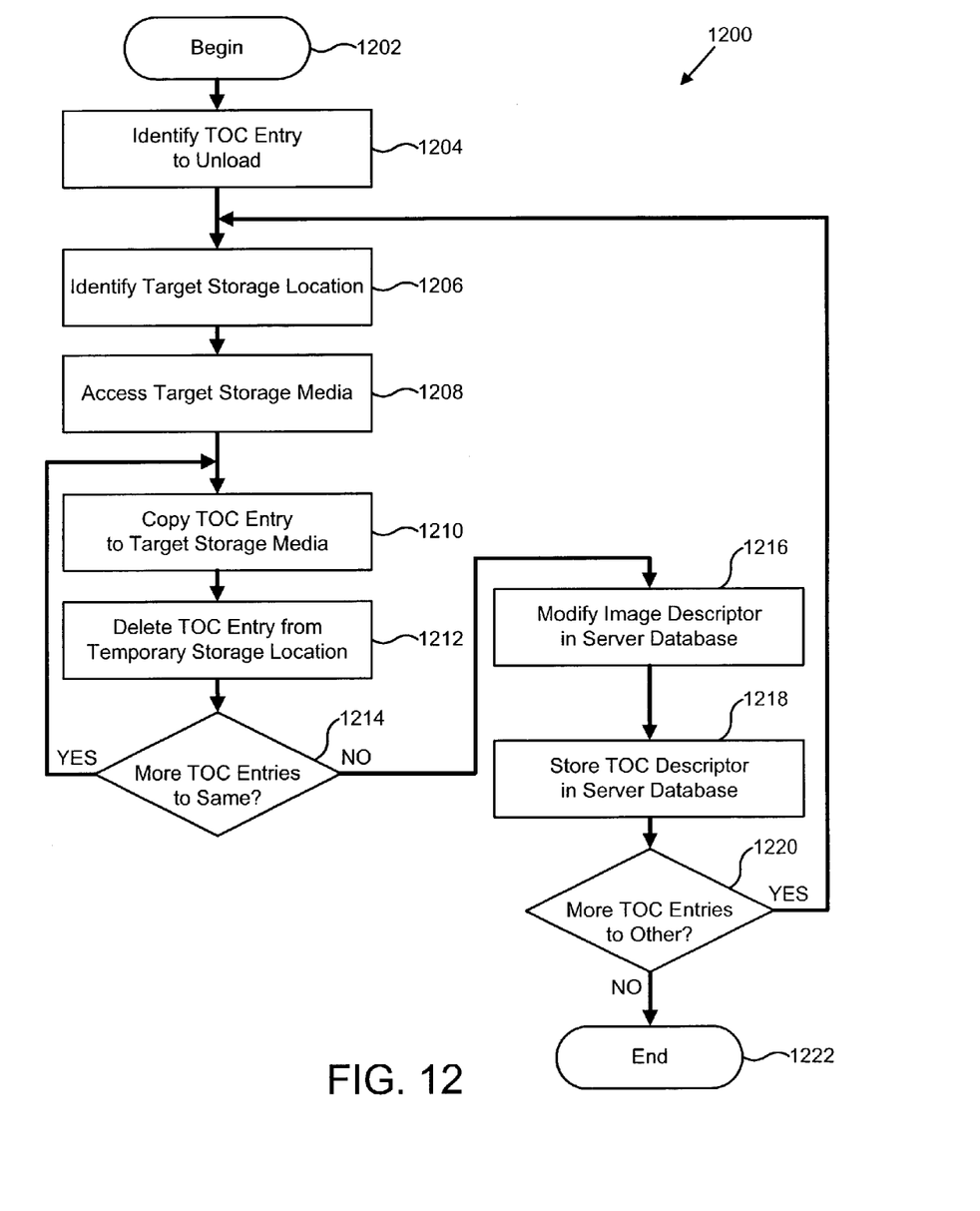
FIG. 12 is a schematic flow chart diagram illustrating one embodiment of a representative hierarchical data storage management process for unloading table of contents (TOC) entries from a database table to a table of contents (TOC) in a storage hierarchy in accordance with the present invention.

FIG. 12 depicts a representative hierarchical data storage management process 1200 for unloading TOC entries 420 from a temporary storage location, for example in the database 124, to the storage hierarchy 122. This process 1200 may be a sub-process for creating a TOC 802.

The process 1200 begins 1202 by identifying 1204 a TOC entry 420 to unload. The process 1200 then identifies 1206 a target storage location within the storage hierarchy 122 and accesses 1208 the target storage media, such as magnetic disk 202.

Once the target storage media is accessed 1208, the process 1200 copies 1210 the TOC entry 420 from the temporary storage location to the target storage media. Copying 1210 a TOC entry 420 to the storage hierarchy 122 essentially creates the TOC 802 that may ultimately include a plurality of TOC entries 420. The TOC entries 420 may be arranged and combined within the TOC 802 in any suitable manner, such as a flat file, a linked list, or any suitable data structure capable of handling the metadata as a single file or object. The TOC 802 need not be a formal table within the database 124 or storage hierarchy 122.

The process 1200 subsequently may delete 1212 the TOC entry 420 from the temporary storage location per policy management of the hierarchical data storage subsystem 104, such as via the policy management module 308 shown in FIG. 3.

The process 1200 then determines 1214 if more TOC entries 1214 are to be copied from the temporary storage location to the same TOC 802 in the storage hierarchy 122. If so, the process 1200 identifies (similar to step 1204) the additional TOC entries 420 to unload and iteratively returns to step 1210. If a complete TOC 802 has been unloaded from the temporary storage location to the proper location in the storage hierarchy 122, the process 1200 modifies 1216 the image descriptor 700 of the image 602 corresponding to the completed TOC 802. The process 1200 also creates and stores 1218 a TOC descriptor 900 in the database 124 in one embodiment.

The process 1200 then determines 1220 if any TOC entries 420 corresponding to another TOC 802 are to be unloaded. If it is determined 1220 that more TOC entries 420 for another TOC 802 are to be unloaded, the process 1200 identifies (similar to step 1204) the TOC entries 420 to be unloaded and iteratively returns to step 1206. Otherwise, the process ends 1222.

One skilled in the art will recognize that processes 1100 and 1200 may be streamlined into a single process for creating a TOC 802. In this streamlined process, it may be unnecessary to temporarily store the TOC entries 420 in a temporary storage location such as the database 124. Rather, the TOC entries 420 may be stored directed in the storage hierarchy 122. The TOC creation module 302 may facilitate such creation of a TOC 802. In a similar manner, the TOC update module 304 may implement similar operations in order to update a TOC entry 420 in an existing TOC 802. Also, the TOC update module 304 may modify an image descriptor 700 or TOC descriptor 900 as required to correlate to any modification in the corresponding TOC 802.

Figure 13:
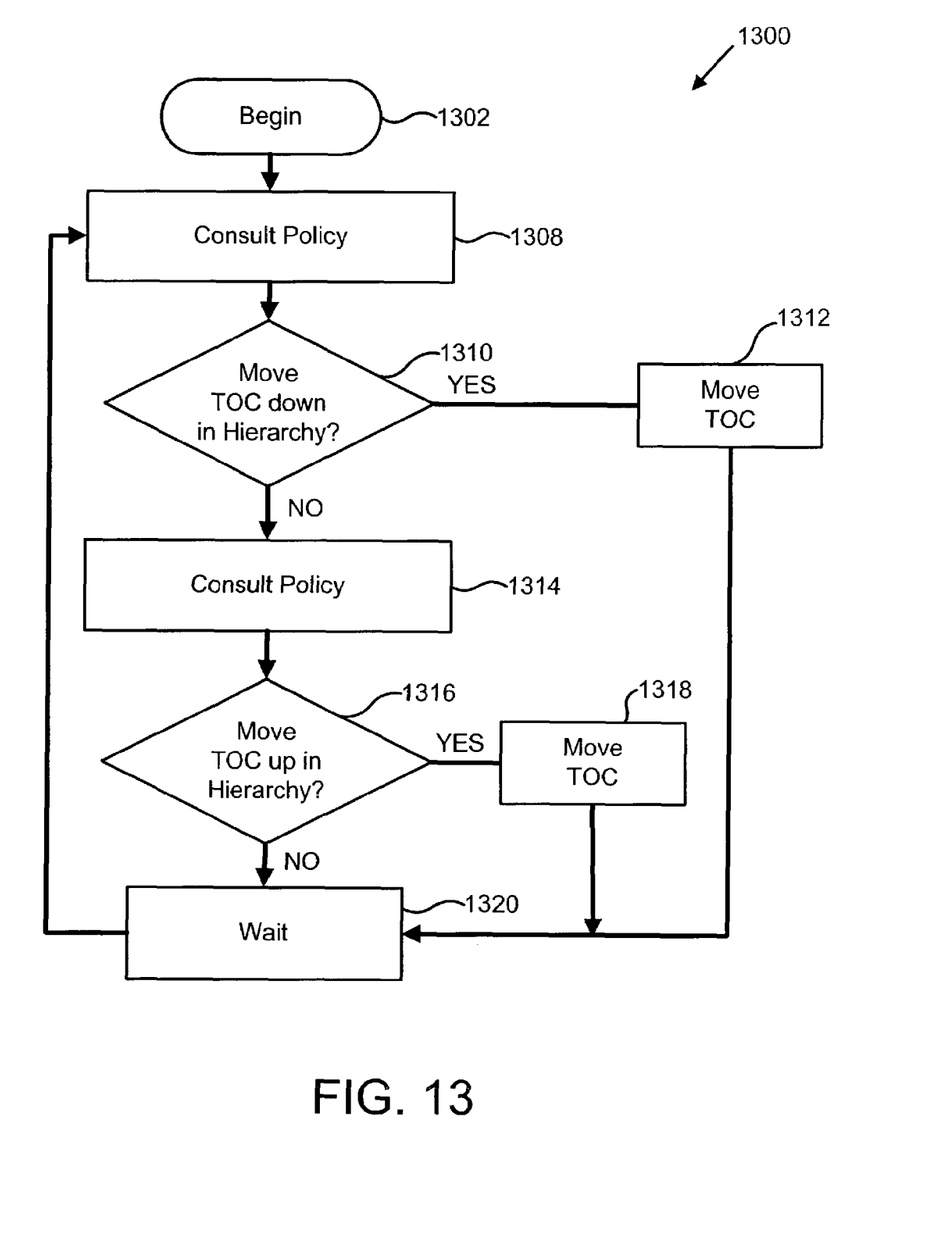
FIG. 13 is a schematic flow chart diagram illustrating one embodiment of a representative hierarchical data storage management process for dynamically managing a TOC according to a policy in accordance with the present invention.

FIG. 13 depicts a process 1300 for dynamically managing the storage location of the table of contents (TOC) 802 in the temporary storage location, such as the database 124, and in the storage hierarchy 122. The method 1300 begins 1302 once the TOC entries 420 are ready to be aggregately stored as a TOC 802, whether in a temporary storage location in the database 124, in the storage hierarchy 122, or in another appropriate storage location. In determining where to store the TOC 802, the process 1300 preferably consults 1308 a policy.

The policy may be contained in the policy management module 308 of FIG. 3, and indeed the policy management module 308 may be configured to make the determination of where to store the TOC 802. Thus, in one embodiment, the step of consulting 1308 the policy may be conducted by the policy management module 308 determining whether to leave the TOC 802 where it was generated (in one embodiment in the database 124) or to relocate the TOC 802 within a storage hierarchy 122.

In one embodiment, the storage hierarchy 122 is the storage hierarchy 122 of FIG. 2. As discussed above, the database 124 may be considered a part of the storage hierarchy 1122 and may be considered to be a top tier in the storage hierarchy 122.

In the depicted embodiment, the policy is consulted 1308 once to determine whether to move 1310 the TOC 802 down in the hierarchy and is consulted 1314 once to determine whether to move 1316 the TOC 802 up in the hierarchy 122. If the decision at the decision block 1310 is to move the TOC 802 down in hierarchy 122, the process 1300 proceeds to move 1312 the TOC 802 accordingly. Thus, in one embodiment, it may be decided 1310 to move the TOC 802 out of the database 124 into a fast access drive 202 or a slower access drive 204, or other devices within the storage hierarchy 122. If the decision at the decision block 1310 is not to move the TOC 802 down in hierarchy 122, the process 1300 proceeds to a block 1314 where it consults the policy again for a determination of whether to move the TOC 802 up in the hierarchy 122.

If at the step 1316, the process 1300 determines that the subject TOC 802 should be moved up in the hierarchy 122, the process 1300 proceeds to move 1318 the TOC 802 to a position higher in the storage hierarchy 122. Afterward, the process 1300 waits 1320 according to policy or according to an input signal before returning to step 1308 to revisit the decisions of whether to move 1310 the TOC 802 down in the hierarchy 122 or move 1316 the TOC 802 up in the hierarchy 122.

The wait 1320 may be due to policy that invokes the process 1300 at certain time intervals in one embodiment. In an alternative embodiment the process 1300 may wait 1320 for receipt of a certain input signal from a user or automated process that invokes further dynamic management of the storage locations of the TOCs. The process 1300 iteratively continues in this manner, continually or periodically determining 1310, 1316 whether to adjust the storage location of the TOC 802 in the hierarchical data storage subsystem 104 until the process 1300 is terminated when the system 104 is shut down.

Considerations of whether to move the TOC 802 up or down in the hierarchy 122 or to allow it, at a minimum, to remain at its current level, include factors such as whether the TOC 802 was just recently generated, how long it has been resident in its current storage location, how frequently information within the TOC 802 is accessed, as well as potentially how recently it has been accessed. Other potential determinations might include the nature of the data objects 410, the subject matter of the contents of the data objects 410, and the author/user of the various data objects 410 within the TOC 802. One or more of these considerations as well as additional policy considerations may be used at each of the steps 1310 and 1316.

In an alternate embodiment, a TOC 802 may virtually move 1318 up within the storage hierarchy 122 through caching instead of actual relocation of the TOC 802. In this way, a TOC 802 within the storage hierarchy 122 may be accessed and copied to a cache, but left in the storage hierarchy 122. The cache copy of the TOC 802 may be retained in the cache according to a policy, after which time it may be deleted.

In a further embodiment, a TOC 802 may be moved within the storage hierarchy 122 from one storage media location to a second storage media location within the same level or tier of the storage hierarchy 122. This may be performed, for example, in response to a reclamation operation the system 100 reclaims storage space from which TOC entries 420 within a TOC 802 may have been deleted. Similarly, a reclamation process may relocate TOC's 802 in order to group the TOC's 802 and unused storage space.

Figure 14:
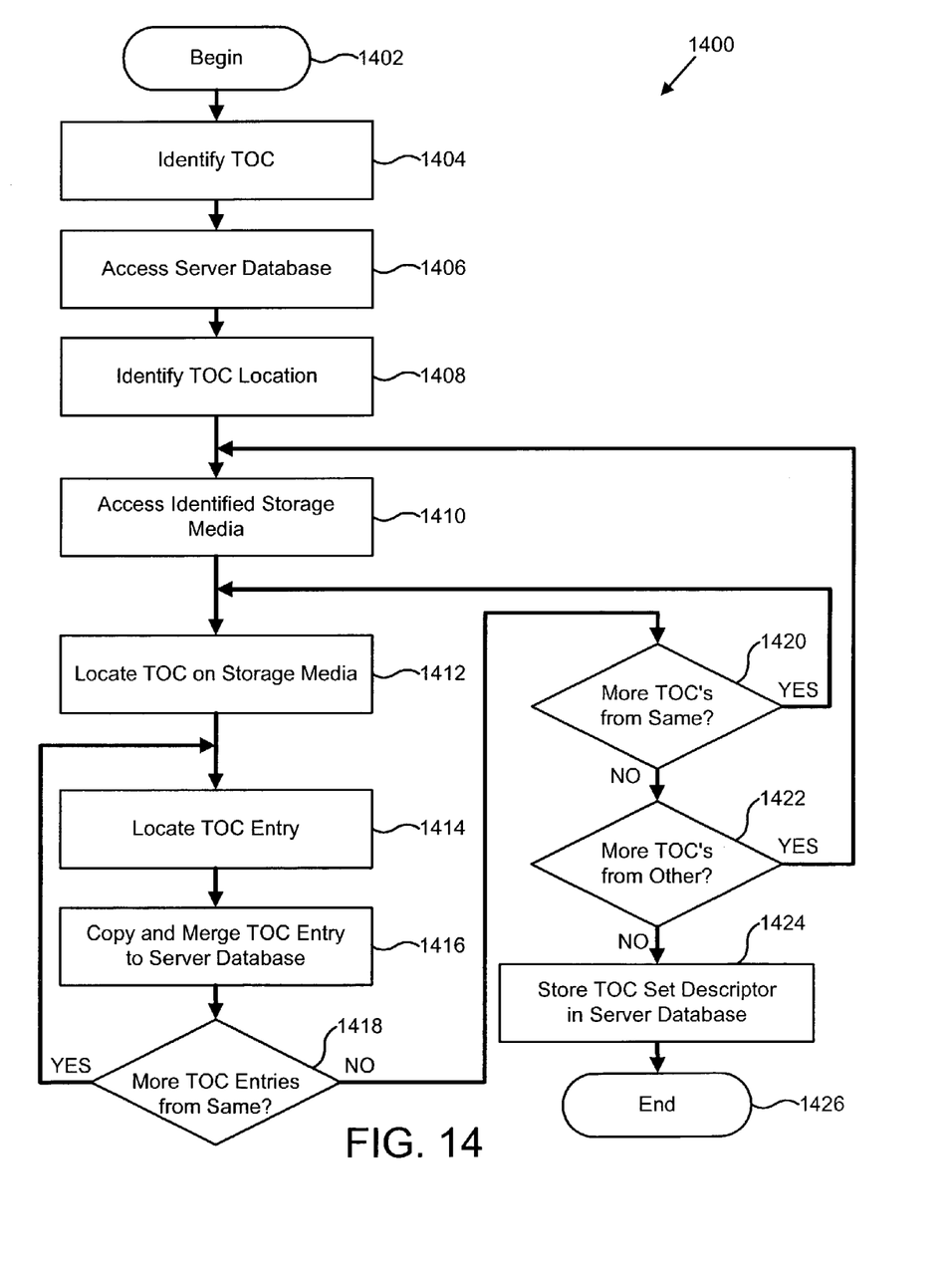
FIG. 14 is a schematic flow chart diagram illustrating one embodiment of a representative hierarchical data storage management process for creating a set of tables of contents (TOC Set) in accordance with the present invention.

FIG. 14 depicts a representative hierarchical data storage management process 1400 for creating a TOC set 804. As described above, a TOC set 804 includes the merged TOC entries 420 of one or more TOCs 802 for manipulation by user or storage management operations in a flexible and efficient manner.

The process 1400 begins 1402 by identifying 1404 a TOC 802 whose TOC entries 420 are to be included in a TOC set 804. The TOC entries 420 of the identified 1404 TOC 802, previously stored (refer to process 1200) in the storage hierarchy 122, must be retrieved. In order to retrieve the TOC entries 420, the process 1400 accesses 1406 a database table including the TOC descriptor 900 corresponding to the identified 1404 TOC 802.

After accessing 1406 the database table to identify 1408 the storage location of the subject TOC 802, the process 1400 accesses 1410 the identified 1408 storage media referenced in the database table. This step 1410 may include in one embodiment accessing a magnetic disk 202 on which the TOC entries 420 may be stored. Alternately, the step 1410 may include loading an optical disk 206 and allowing the disk to accelerate to the proper rotational spin speed. In a further embodiment, the step 1410 may include accessing a magnetic tape 208.

The process 1400 continues by locating 1412 the TOC 802 in the storage media and locating 1414 a specific TOC entry 420. The process 1400 then copies 1416 the TOC entry 420 from the storage hierarchy 122 to a database table, similar to the database tables used to store the image descriptor 700 and TOC descriptor 900. When the TOC entry 420 is copied 1416 to the database table, it may be merged with other TOC entries 420 from distinct TOCs 802.

After the subject TOC entry 420 has been copied 1416, the process 1400 determines 1418 if additional TOC entries 420 from the same TOC 802 are to be merged in the TOC set 804 in the database table. If it is determined 1418 that more TOC entries 420 from the same TOC 802 are to be merged, the process 1400 identifies the specific TOC entries 420 and iteratively returns to step 1414.

After all of the TOC entries 420 from a single TOC 802 have been copied 1416 to the database table, the process determines 1420 if TOC entries 420 from additional TOCs 802 located on the same storage media are designated to be included in the TOC set 804. If so, the process 1400 identifies (similar to step 1404) the additional TOCs 802 and the process 1400 iteratively returns to step 1412. Otherwise, the process 1400 determines 1422 if TOC entries 420 from TOCs 802 located on different storage media are designated to be included in the TOC set 804. If so, the process 1400 identifies (similar to step 1404) the additional TOCs 802 and identifies (similar to step 1408) the corresponding storage locations. The process 1400 then iteratively returns to step 1410.

Once the process 1400 has copied 1416 all of the TOC entries 420 from all of the TOCs 802 that are identified 1404 to be merged in the TOC set 804, the process 1400 creates and stores 1424 a TOC set descriptor 1000, as described in FIG. 10, in memory 140 for possible future creation of and access to the same TOC set 804. The process 1400 then ends 1426.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An automated process for managing data in a hierarchical data storage system, the process comprising:

storing a plurality of data objects in an image in a storage hierarchy, the image configured as a single object to a storage management system, wherein pluralities of data objects are stored to a plurality of images, each image having an image descriptor comprising a name, a client identifier, a table of contents identifier, a storage pool of the image, a storage volume of the image, a location of the image, and a size of the image;

generating a table of contents for each image, each table of contents containing a plurality of entries and comprising the table of contents identifier, each entry comprising information describing characteristics of one of the data objects within the image, the information comprising a data object name, a client path, a data object size, a data object location, permission rights, and a data object version;

generating a table of contents set (TOC set) comprising TOC set descriptor and a plurality of tables of contents, the TOC set descriptor comprising a handle field that identifies the TOC set, a time stamp field that identifies a time stamp associated with the most recent access of the TOC, a table of contents identification list field that identifies data objects that have been accessed and merged in the TOC set, a table of contents count field that identifies a total number of table contents accessed, and a table of contents entry count field that identifies a total number of table of content entries that have been accessed and merged into the TOC set;

dynamically managing a storage location of each table of contents; and copying a plurality of entries from at least one of the tables of contents in the storage hierarchy to a storage server database that is a database attendant to the storage management system.

2. The process of claim 1, further comprising updating one of the plurality of entries in the table of contents.

3. The process of claim 1, wherein generating the table of contents comprises generating the table of contents in the storage hierarchy.

4. The process of claim 1, wherein dynamically managing the location of the table of contents comprises moving the table of contents from the first storage media location to the second storage media location within the storage hierarchy according to a policy that considers when the table of contents was most recently accessed.

5. The process of claim 1, wherein dynamically managing the location of the table of contents further comprises moving the table of contents from a first storage location to a second storage location within a storage server database according to a policy that considers how frequently the table of contents is accessed.

6. The process of claim 1, wherein dynamically managing the location of the table of contents comprises moving the table of contents from a storage location within a storage server database to a storage location within the storage hierarchy according to a policy.

7. The process of claim 1, further comprising accessing the storage server database to search for and retrieve the information corresponding to a data object.

8. An automated process for managing data in a hierarchical data storage system, the process comprising:

storing a plurality of data objects in an image in a storage hierarchy, the image configured as a single object to a storage management system, wherein pluralities of data objects are stored to a plurality of images, each image having an image descriptor comprising a name, a client identifier, a table of contents identifier, storage pool of the image, a storage volume of the image, a location of the image, and a size of the image;

generating a table of contents for each image, each table of contents containing a plurality of entries and comprising the table of contents identifier, each entry comprising information describing characteristics of one of the data objects within the image, the information comprising data object name, a client path, a data object size, a data object location, permission rights, and a data object version;

generating a TOC set comprising a TOC set descriptor and a plurality of tables of contents, the TOC set descriptor comprising a handle field that identifies the TOC set, a time stamp field that identifies a time stamp associated with the most recent access of the TOC, a table of contents identification list field that identifies data objects that have been accessed and merged in the TOC set, a table of contents count field that identifies a total number of table of contents accessed, and a table of contents entry count field that identifies a total number of table of content entries that have been accessed and merged into the TOC set;

dynamically managing a storage location of each table of contents within the storage hierarchy, within a storage server database, and between the storage hierarchy and the database according to a policy;

moving each table of contents from a first storage media within the storage hierarchy to a second storage media within the storage hierarchy according to a policy; and copying a plurality of entries from at least one of the tables of contents in the storage hierarchy to a storage server database that is a database attendant to the storage management system.

9. A process in a hierarchical data storage management system for merging a plurality of entries from one or more tables of contents to form a TOC set for enhanced query performance in a data storage system, the process comprising:

storing a plurality of data objects in an image in a storage hierarchy, the image configured as a single object to a storage management system, wherein pluralities of data objects are stored to a plurality of images, each image having an image descriptor comprising a name, a client identifier, a table of contents identifier, storage pool of the image, a storage volume of the image, a location of the image, and a size of the image;

generating a table of contents for each image, each table of contents containing a plurality of entries and comprising the table of contents identifier, each entry comprising information describing characteristics of one of the data objects within the image, the information comprising a data object name, a client path, a data object size, a data object location, permission rights, and a data object version;

generating a TOC set comprising a TOC set descriptor and a plurality of tables of contents, the TOC set descriptor comprising a handle field that identifies the TOC set, a time stamp field that identifies a time stamp associated with the most recent access of the TOC, a table of contents identification list field that identifies data objects that have been accessed and merged in the TOC set, a table of contents count field that identifies a total number of table of contents accessed, and a table of contents entry count field that identifies a total number of table of content entries that have been accessed and merged into the TOC set;

copying a plurality of entries from at least one of the tables of contents in the storage hierarchy to a storage server database that is a database attendant to the storage management system; and merging the entries from the at least one table of contents into a searchable database table in the storage server database.

10. The process of claim 9, wherein merging the entries further comprises preserving a version relationship of a data object having more than one corresponding entry in the plurality of tables of contents.

11. The process of claim 9, further comprising identifying the TOC set with a token.

12. The process of claim 11, storing the token in a storage location for future identification of and access to the TOC set.

13. The process of claim 9, further comprising extending the TOC set to include the entries from an additional table of contents from the storage hierarchy.

14. The process of claim 9, further comprising retracting the TOC set to exclude the entries from one of the tables of contents from the TOC set.

15. The process of claim 9, further comprising retaining the TOC set in the storage server database according to a policy.

16. A process in a hierarchical data storage management system for merging a plurality of entries from one or more tables of contents to form a TOC set for enhanced query performance in a data storage system, the process comprising:

storing a plurality of data objects in an image in a storage hierarchy, the image configured as a single object to a storage management system, wherein pluralities of data objects are stored to a plurality of images, each image having an image descriptor comprising a name, a client identifier, a table of contents identifier, storage pool of the image, a storage volume of the image, a location of the image, and a size of the image;

generating a table of contents for each image, each table of contents containing a plurality of entries and comprising the table of contents identifier, each entry comprising information describing characteristics of one of the data objects within the image, the information comprising a data object name, a client path, a data object size, a data object location, permission rights, and a data object version;

generating a TOC set comprising a TOC set descriptor and a plurality of tables of contents, the TOC set descriptor comprising a handle field that identifies the TOC set, a time stamp field that identifies a time stamp associated with the most recent access of the TOC, a table of contents identification list field that identifies data objects that have been accessed and merged in the TOC set, a table of contents count field that identifies a total number of table of contents accessed, and a table of contents entry count field that identifies a total number of table of content entries that have been accessed and merged into the TOC set;

copying a plurality of entries from at least one of the tables of contents in the storage hierarchy to a storage server database that is a database attendant to the storage management system;

merging the entries from the at least one table of contents into a searchable database table in the storage server database, including preserving a version relationship of a data object having more than one corresponding entry in a plurality of tables of contents;

identifying the TOC set with a token;

storing the token in a storage location for future identification of and access to the TOC set;

allowing the TOC set to be extended by adding the entries of an additional table of contents from the storage hierarchy;

allowing the TOC set to be retracted by excluding the entries from one of the tables of contents from the TOC set; and retaining the TOC set in the storage server database according to a policy.

* * * * *